US012711704B2

(12) United States Patent
Lee et al.

(10) Patent No.: US 12,711,704 B2
(45) Date of Patent: Aug. 18, 2026

(54) INTRAORAL IMAGE PROCESSING DEVICE AND INTRAORAL IMAGE PROCESSING METHOD

(71) Applicant: MEDIT CORP., Seoul (KR)

(72) Inventors: Sung Hoon Lee, Seoul (KR); Dong Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 174 days.

(21) Appl. No.: 18/574,472

(22) PCT Filed: Jun. 13, 2022

(86) PCT No.: PCT/KR2022/008291
§ 371 (c)(1),
(2) Date: Dec. 27, 2023

(87) PCT Pub. No.: WO2023/277391
PCT Pub. Date: Jan. 5, 2023

(65) Prior Publication Data

US 2024/0185520 A1 Jun. 6, 2024

(30) Foreign Application Priority Data

Jun. 29, 2021 (KR) ........................ 10-2021-0084791
May 30, 2022 (KR) ........................ 10-2022-0066360

(51) Int. Cl.
*G06T 17/00* (2006.01)
*A61C 13/34* (2006.01)
(Continued)

(52) U.S. Cl.
CPC .............. *G06T 17/00* (2013.01); *A61C 13/34* (2013.01); *G06T 7/0012* (2013.01); *G06T 7/11* (2017.01);
(Continued)

(58) Field of Classification Search
CPC ......... G06T 17/00; G06T 7/0012; G06T 7/11; G06T 7/344; G06T 7/75; G06T 2200/04;
(Continued)

(56) References Cited

U.S. PATENT DOCUMENTS

2013/0226534 A1 8/2013 Fisker et al.
2015/0056576 A1 2/2015 Nikolskiy et al.
(Continued)

FOREIGN PATENT DOCUMENTS

EP 4 233 782 A1 8/2023
EP 4 238 534 A1 9/2023
(Continued)

OTHER PUBLICATIONS

Extended European Search Report dated May 13, 2025 in Application No. 22833447.0.
(Continued)

*Primary Examiner* — King Y Poon
*Assistant Examiner* — Patrick P Galera
(74) *Attorney, Agent, or Firm* — Sughrue Mion, PLLC

(57) ABSTRACT

Provided are an intraoral image processing method and an intraoral image processing device. In detail, an intraoral image processing method according to an embodiment may include obtaining three-dimensional (3D) intraoral data on an oral cavity including teeth and a gingiva, and generating an outer surface (eggshell) of a target tooth that is a subject of a prosthesis from among the teeth included in the 3D intraoral data, wherein the generating of the outer surface includes automatically generating a portion corresponding to a void area between the target tooth and at least one adjacent tooth adjacent to the target tooth.

19 Claims, 10 Drawing Sheets

(51) Int. Cl.

*G06T 7/00* (2017.01)
*G06T 7/11* (2017.01)
*G06T 7/33* (2017.01)
*G06T 7/73* (2017.01)
*G06V 20/50* (2022.01)
*G06V 20/64* (2022.01)

(52) U.S. Cl.

CPC ................ *G06T 7/344* (2017.01); *G06T 7/75* (2017.01); *G06V 20/50* (2022.01); *G06V 20/64* (2022.01); *G06T 2200/04* (2013.01); *G06T 2207/20021* (2013.01); *G06T 2207/30036* (2013.01); *G06T 2210/41* (2013.01); *G06V 2201/03* (2022.01)

(58) Field of Classification Search

CPC . G06T 2207/20021; G06T 2207/30036; G06T 2210/41; G06T 2207/10028; G06T 7/12; A61C 13/34; A61C 9/0053; A61C 9/00; A61C 13/00; A61C 13/0004; G06V 20/50; G06V 20/64; G06V 2201/03; G06F 30/12; G06F 2111/16; G06F 30/20; A61B 2034/101; A61B 2034/105; A61B 2034/108; A61B 34/10; A61B 34/25; G16H 50/50

See application file for complete search history.

(56) References Cited

U.S. PATENT DOCUMENTS

2015/0100280 A1 4/2015 Jula
2019/0282344 A1* 9/2019 Azernikov ......... A61C 13/0004
2020/0125069 A1* 4/2020 Sirovskiy ............... A61C 7/002
2021/0321872 A1* 10/2021 Saphier .................. A61B 5/004

FOREIGN PATENT DOCUMENTS

JP 2006-175205 A 7/2006
KR 10-1888361 B1 9/2018
KR 10-1911693 B1 1/2019
KR 10-2019-0074062 A 6/2019
KR 10-2196147 B1 12/2020
KR 10-2022-0054095 A 5/2022
KR 10-2022-0056765 A 5/2022

OTHER PUBLICATIONS

International Search Report for PCT/KR2022/008291 dated Sep. 21, 2022.

* cited by examiner 100
110
120
121
300
310

500
OCCLUSAL DIRECTION
mesial
lingual
buccal
distal
510
520
550
530
531
532
533
534
511
512
513
514
521
541

1000
1010
1020
1110
1100

INTRAORAL IMAGE PROCESSING DEVICE AND INTRAORAL IMAGE PROCESSING METHOD

CROSS REFERENCE TO RELATED APPLICATIONS

This application is a National Stage of International Application No. PCT/KR2022/008291 filed Jun. 13, 2022, claiming priority based on Korean Patent Application No. 10-2021-0084791 filed Jun. 29, 2021 and Korean Patent Application No. 10-2022-0066360 filed May 30, 2022.

TECHNICAL FIELD

Disclosed embodiments relate to an intraoral image processing device and an intraoral image processing method, and more particularly, to an intraoral image processing device and method for automatically generating an outer surface of a target tooth that is a subject of a prosthesis, and an intraoral image processing method.

BACKGROUND ART

Dental computer-aided design/computer-aided manufacturing (CAD/CAM) technology is widely used in dental treatment, particularly, prosthetics. The most important thing in dental treatment using CAD/CAM is to obtain precise three-dimensional (3D) data on a shape of an object such as a patient's teeth, gingiva, or a jawbone. When 3D data obtained from an object is used to perform dental treatment, accurate calculation may be performed by a computer. For example, methods such as computed tomography (CT), magnetic resonance imaging (MRI), and optical scanning may be used to obtain 3D data of an object in dental CAD/CAM treatment.

When an intraoral image processing device obtains a 3D intraoral image from scan data, a user may select a target tooth that is a subject of a prosthesis from among teeth in the 3D intraoral image. However, in the prior art, there was the inconvenience that the user has to predict and directly work or modify a shape of an interdental area, etc., which was not possible to be scanned due to adjacent teeth adjacent to the target tooth. Accordingly, a shape of the prosthesis may be different from a shape of an actual tooth, and thus, the prosthesis may not fit the target tooth due to adjacent teeth, a patient may have a foreign body sensation, and it may take a long time to correct it. Accordingly, there is a need for a technology for automatically generating an outer surface of a target tooth similar to a shape of an actual target tooth, for an area that may not be scanned, such as an area between the target tooth that is a subject of a prosthesis and an adjacent tooth.

DISCLOSURE

Technical Problem

An objective of a disclosed embodiment is to provide an intraoral image processing method for automatically generating, when a target tooth that is a subject of a prosthesis is selected in a three-dimensional (3D) intraoral data, a portion corresponding to a void area between the target tooth and at least one adjacent tooth adjacent to the target tooth, and an apparatus for performing an operation according to the intraoral image processing method.

Technical Solution

According to a first aspect of the disclosure, an intraoral image processing method includes obtaining three-dimensional (3D) intraoral data on an oral cavity including teeth and a gingiva, and generating an outer surface (eggshell) of a target tooth that is a subject of a prosthesis from among the teeth included in the 3D intraoral data, wherein the generating of the outer surface includes automatically generating a portion corresponding to a void area between the target tooth and at least one adjacent tooth adjacent to the target tooth.

In the intraoral image processing method according to an embodiment of the disclosure, the generating of the outer surface may include generating the portion corresponding to the void area, based on the 3D intraoral data.

In the intraoral image processing method according to an embodiment of the disclosure, the generating of the outer surface may include generating the portion corresponding to the void area, based on data adjacent to the void area in the 3D intraoral data.

In the intraoral image processing method according to an embodiment of the disclosure, the generating of the outer surface may include identifying a virtual margin line between the target tooth and the gingiva, based on the 3D intraoral data, and generating the outer surface, based on the target tooth and the identified virtual margin line.

In the intraoral image processing method according to an embodiment of the disclosure, the generating of the outer surface may include generating a portion of the outer surface corresponding to the void area, based on a portion of the virtual margin line corresponding to the void area.

In the intraoral image processing method according to an embodiment of the disclosure, the generating of the outer surface may include identifying a virtual target tooth by identifying a virtual bottom face corresponding to a bottom face of the target tooth based on the virtual margin line, and connecting the virtual bottom face to the target tooth, and generating the outer surface, based on the virtual target tooth and the virtual margin line.

In the intraoral image processing method according to an embodiment of the disclosure, the identifying of the virtual margin line may include, for each of points of the target tooth, selecting at least one of the points of the target tooth, by identifying a point whose distance to at least one of points included in a boundary of the gingiva is equal to or less than a preset threshold value, based on data corresponding to the boundary of the gingiva and the target tooth in the 3D intraoral data, and identifying the virtual margin line by connecting the selected at least one point.

In the intraoral image processing method according to an embodiment of the disclosure, the identifying of the virtual target tooth may include identifying the virtual bottom face, by expanding a reference surface identified based on the virtual margin line in a direction opposite to an occlusal direction of the target tooth, and identifying the virtual target tooth, by merging the virtual bottom face with the target tooth.

In the intraoral image processing method according to an embodiment of the disclosure, the generating of the outer surface may include aligning the virtual target tooth with the virtual margin line, and dividing the virtual target tooth into areas along the virtual margin line, and generating the outer surface, by identifying an area in the occlusal direction from among the areas of the virtual target tooth.

In the intraoral image processing method according to an embodiment of the disclosure, the intraoral image processing method may further include identifying an expanded reference surface, by expanding a reference surface identified based on the virtual margin line, identifying a virtual adjacent gingiva for a gingiva adjacent to the target tooth, by merging the expanded reference surface with a surface obtained by expanding the expanded reference surface in a direction opposite to an occlusal direction, and generating the outer surface, based on the virtual adjacent gingiva and the virtual target tooth.

In the intraoral image processing method according to an embodiment of the disclosure, the generating of the outer surface may include generating the outer surface of the target tooth, by booleaning the virtual adjacent gingiva and the virtual target tooth.

In the intraoral image processing method according to an embodiment of the disclosure, the identifying of the virtual target tooth may include identifying the virtual target tooth by merging the virtual bottom face with the target tooth and then smoothing a merged area.

According to a second aspect of the disclosure, an intraoral image processing device includes a memory storing one or more instructions, and a processor configured to execute the one or more instructions stored in the memory to obtain three-dimensional (3D) intraoral data on an oral cavity including teeth and a gingiva, and generate an outer surface of a target tooth that is a subject of a prosthesis from among the teeth included in the 3D intraoral data, wherein a portion corresponding to a void area between the target tooth and at least one adjacent tooth adjacent to the target tooth is automatically generated.

According to a third aspect of the disclosure, a computer-readable recording medium has recorded thereon a program for performing the intraoral image processing method on a computer.

Advantageous Effects

According to an intraoral image processing method, an apparatus for performing an operation according to the intraoral image processing method, and a computer-readable recording medium in which programs or instructions for performing the intraoral image processing method are stored according to a disclosed embodiment, a virtual margin line between a target tooth that is a subject of a prosthesis and a gingiva may be identified, and an outer surface of the target tooth may be generated by using the virtual margin line. Accordingly, even when there is a void area with no three-dimensional (3D) intraoral data between the target tooth and an adjacent tooth, the outer surface of the target tooth which is very similar to an outer surface of an actual tooth may be automatically generated.

DESCRIPTION OF DRAWINGS

The disclosure may be readily understood from the following detailed description in conjunction with the accompanying drawings, and reference numerals denote structural elements.

MODE FOR INVENTION

Figure 1:
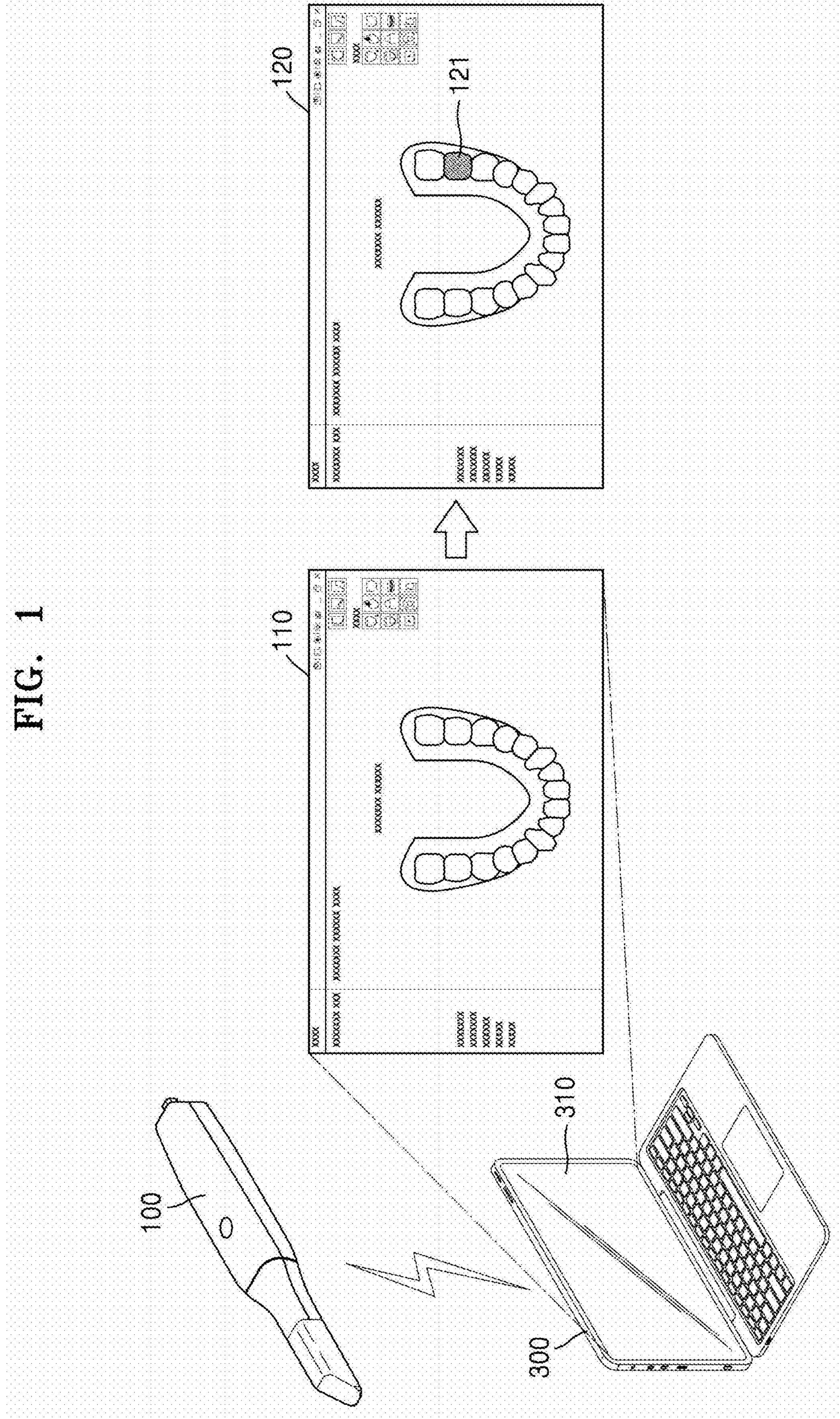
FIG. 1 is a view for describing an intraoral image processing system, according to a disclosed embodiment.

Principles and embodiments of the disclosure will be described in detail in order to fully convey the scope of the disclosure and enable one of ordinary skill in the art to embody and practice the disclosure. The embodiments of the disclosure may be implemented in various forms.

The same reference numerals denote the same elements throughout the specification. All elements of embodiments are not described in the specification, and descriptions of matters well known in the art to which the disclosure pertains or repeated descriptions between the embodiments will not be given. The terms such as "part" and "portion" used herein denote those that may be implemented by software or hardware. According to embodiments, a plurality of parts or portions may be implemented by a single unit or element, or a single part or portion may include a plurality of units or elements. Hereinafter, operation principles and embodiments of the disclosure will be described in detail with the accompanying drawings.

In the specification, an "object" is something to be imaged, and may include a human, an animal, or a part of a human or animal. For example, an object may include a body part (e.g., an organ), an artificial structure that may be attached or inserted into the object, or a phantom. For example, an object may include teeth, gingiva, at least a portion of an oral cavity, and/or an artificial structure (e.g., an orthodontic appliance including brackets and a wire, an implant, an artificial tooth, a dental restoration including an inlay and an onlay, or an orthodontic aid inserted into the oral cavity) that may be inserted into the oral cavity, and teeth or gingiva to which an artificial structure is attached.

In the disclosure, an 'intraoral image' may refer to a two-dimensional (2D) image of an object or a three-dimensional (3D) intraoral image that three-dimensionally represents the object. In detail, an image (hereinafter, referred to as an 'intraoral image') may include an image presenting at least one tooth or an oral cavity including at least one tooth. In the disclosure, an intraoral image may include both a 2D frame and a 3D frame. For example, an intraoral image may include a 2D frame including 2D images obtained at different viewpoints of an object, or a 3D frame represented using a point cloud or a polygon mesh. An intraoral image may be referred to as 3D intraoral data.

In the disclosure, a prosthesis may be a device used to restore missing teeth or missing parts of teeth by protecting them by using an artificial object. In detail, a prosthesis in the present disclosure may refer to a provisional prosthesis for maintaining the function of teeth until a final prosthesis, which takes a considerable amount of time to produce, is completed. A provisional prosthesis may be divided into a provisional prosthesis (crown) and a temporary prosthesis (crown) according to whether prep data is used. In the present application, a prosthesis may be referred to as a crown.

Hereinafter, embodiments will be described in detail with reference to the drawings.

FIG. 1 is a view for describing an intraoral image processing system, according to a disclosed embodiment.

Referring to FIG. 1, an intraoral image processing system according to an embodiment of the disclosure may include a scanner 100 and an intraoral image processing device 300.

The scanner 100 according to an embodiment of the disclosure is a device for scanning an object and is a medical device for obtaining an image in an oral cavity. In detail, the scanner 100 may be a device for obtaining an image of an oral cavity including at least one teeth by being inserted into the oral cavity and scanning teeth in a non-contact manner. Also, the scanner 100 may have a form that may be inserted into and taken out from an oral cavity, and may scan the inside of a patient's oral cavity by using at least one image sensor (e.g., an optical camera). In order to image a surface of at least one of teeth and gingiva inside an oral cavity that is an object and an artificial structure (e.g., an orthodontic appliance including brackets and a wire, an implant, an artificial tooth, or an orthodontic aid inserted into the oral cavity) that may be inserted into the oral cavity, the scanner 100 may obtain surface information of the object as 2D image data. The 2D image data obtained by the scanner 100 may be raw data obtained to generate an intraoral image. Although the scanner 100 is an intraoral scanner that may be inserted into the oral cavity in FIG. 1, the scanner 100 applied to embodiments of the disclosure may include a model scanner for scanning a tooth model.

The 2D image data obtained by the scanner 100 according to an embodiment of the disclosure may be transmitted to the intraoral image processing device 300 connected through a wired or wireless communication network. The intraoral image processing device 300 may be connected to the scanner 100 through a wired or wireless communication network, and may receive the 2D image data obtained by scanning the oral cavity from the scanner 100. The intraoral image processing device 300 may generate a 3D intraoral image according to the following embodiments.

In an embodiment of generating a 3D intraoral image, the scanner 100 may transmit raw data obtained by scanning the oral cavity to the intraoral image processing device 300. The intraoral image processing device 300 may generate a 3D intraoral image three-dimensionally representing the oral cavity according to the received raw data. Because the '3D intraoral image' may be generated by three-dimensionally modeling an internal structure of the oral cavity based on the received raw data, the '3D intraoral image' may be referred to as a '3D model', a '3D model of the oral cavity', a '3D intraoral model', 3D intraoral data', or a '3D intraoral image'.

In another embodiment of generating a 3D intraoral image, the scanner 100 may obtain raw data by scanning the oral cavity, and may generate an image corresponding to the oral cavity that is the object by processing the obtained raw data. The scanner 100 may transmit the intraoral image generated to correspond to the oral cavity to the intraoral image processing device 300. Hereinafter, for convenience of explanation, the 3D intraoral image generated by the intraoral image processing device 300 is referred to as '3D intraoral data'.

The intraoral image processing device 300 according to an embodiment of the disclosure may be any electronic device that may generate, process, display, and/or transmit an intraoral image based on 2D image data received from the scanner 100. In detail, the intraoral image processing device 300 may generate information generated by processing 2D image data and/or an intraoral image generated by processing 2D image data, and may display the generated information and/or intraoral image through at least one display unit. The intraoral image processing device 300 is a device for analyzing, processing, displaying, and/or transmitting a received image, and may be a computing device such as, but not limited to, a smartphone, a laptop computer, a desktop computer, a personal digital assistant (PDA), or a tablet PC. For example, the intraoral image processing device 300 may be a server (or a server device) for processing an intraoral image.

Also, the intraoral image processing device 300 according to an embodiment of the disclosure may store and execute dedicated software linked to the scanner 100. The dedicated software may be referred to as a dedicated program or a dedicated application. When the intraoral image processing device 300 operates in conjunction with the scanner 100, the dedicated software stored in the intraoral image processing device 300 may be connected to the scanner 100 and may receive data obtained by scanning an object in real time. The dedicated software may be stored in a memory of the intraoral image processing device 300. Also, the dedicated software may provide a user interface for using data obtained by the scanner 100. A user interface screen provided by the dedicated software may include scan data.

According to an embodiment, when a user selects a target tooth that is a subject of a prosthesis in first 3D intraoral data 110, a target tooth 121 that is a subject of a prosthesis may be displayed in a different color in a second 3D intraoral data 120. In this case, the target tooth that is the subject of the prosthesis may be manually selected by the user or may be automatically selected. A void area between the target tooth 121 and an adjacent tooth adjacent to the target tooth 121 may correspond to an interdental area where there is no data. Accordingly, automatically generating an outer surface even for a void area where there is no data may be an important part in generating a shape of an outer surface of the target tooth 121. In order to automatically generate the void area, an operation of clearly identifying a virtual margin line where the target tooth and a gingiva meet each other may be pre-performed.

Figure 2:
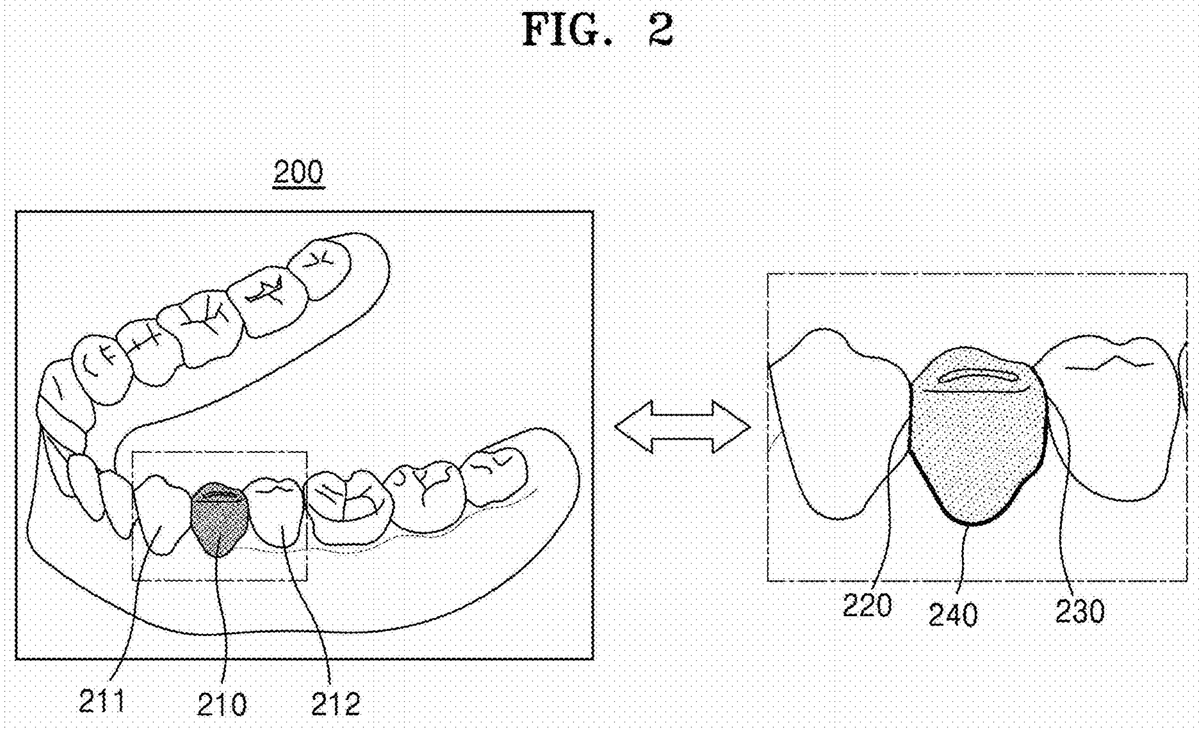
FIG. 2 is a view for describing a void area and a virtual margin line.

FIG. 2 is a view for describing a void area and a virtual margin line.

In the present application, in an embodiment, a void area may refer to an unscanned area between a target tooth and an adjacent tooth, which is difficult to scan with a 3D intraoral scanner. In detail, because there may be no data in an interdental area between a target tooth and at least one adjacent tooth adjacent to the target tooth, the interdental area may be included in a void area. Also, in the present disclosure, an interdental area may be referred to as a void area in a broad sense.

In the present application, a virtual margin line may be a line corresponding to an actual margin line between an actual target tooth and an actual gingiva, predicted by the intraoral image processing device 300. However, there may be an area where there is no data, in 3D intraoral data. Accordingly, a virtual margin line predicted by the intraoral image processing device 300 of the disclosure may be slightly different from an actual margin line. However, according to an embodiment of the specification, the intraoral image processing device 300 may identify a virtual margin line that is very similar to an actual margin line.

The intraoral image processing device 300 according to an embodiment may identify a virtual margin line of a target tooth that is a subject of a prosthesis and may generate an outer surface of the target tooth by using the virtual margin line. In particular, the intraoral image processing device 300 may predict a portion of a virtual margin line corresponding to a void area and may generate a portion of the prosthesis corresponding to the void area which is very similar to an outer surface of an actual tooth.

The intraoral image processing device 300 may identify a virtual margin line between a target tooth and a gingiva, and may predict a virtual margin line of an interdental area where there is no data. For example, an interdental area between a target tooth and adjacent teeth may correspond to an area that may not be scanned by the scanner 100. The interdental area between the target tooth and the adjacent teeth may correspond to an area with no data in a library model.

Referring to FIG. 2, a target tooth 210 that is a subject of a prosthesis may be selected in 3D intraoral data 200, and adjacent teeth adjacent to the target tooth 210 may be determined to be a tooth 211 and a tooth 212. In this case, an interdental area 220 between the target tooth and the tooth 211 may correspond to a void area where there is no data. Likewise, an interdental area 230 between the target tooth 210 and the tooth 212 may also correspond to a void area where there is no data. Accordingly, it may be difficult to accurately identify virtual margin lines corresponding to the interdental area 220 and the interdental area 230.

On the other hand, an area 240 corresponding to a front boundary between the target tooth 210 and a gingiva may correspond to an area where there is no data. A front portion refers to an outer portion of the gingiva not an inner portion close to the tongue.

Accordingly, there is proposed a method of generating an outer surface of a target tooth including not only an area where there is data but also a void area where there is no data by using a virtual margin line.

Figure 3:
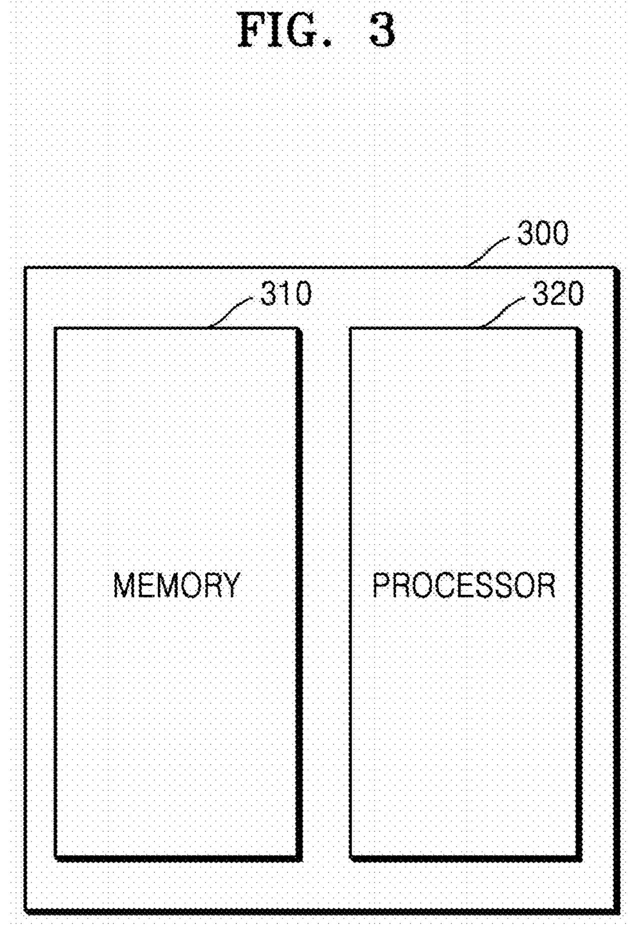
FIG. 3 is a block diagram illustrating an intraoral image processing device, according to an embodiment.

FIG. 3 is a block diagram illustrating an intraoral image processing device, according to an embodiment.

The intraoral image processing device 300 according to an embodiment of the disclosure may be an electronic device for processing 3D intraoral data and displaying the processed 3D intraoral data. The intraoral image processing device 300 according to an embodiment of the disclosure may include a memory 310 and a processor 320. Hereinafter, the elements will be sequentially described.

The memory 310 may store programs for processing and control of the processor 320. The memory 310 according to an embodiment of the disclosure may store one or more instructions.

The memory 310 according to an embodiment of the disclosure may store one or more instructions. The memory 310 may include at least one of an internal memory (not shown) and an external memory (not shown). The memory 310 may store various programs and data used in an operation of the intraoral image processing device 300. For example, the memory 310 may store 3D intraoral data obtained from a library model, and may store raw data or 2D image data obtained from the scanner 100. Also, the memory 310 may store dedicated software linked to the scanner 100. The dedicated software may be a program or an application for providing a user interface for using data obtained by the scanner 100. The memory 310 may store position information of points of 3D intraoral data and connection relationship information between the points from the scanner 100. In detail, the memory 310 may store surface data as a point cloud, and position information of vertices on a surface of an object and connection relationship information between the vertices may be included in the point cloud. Also, the memory 310 may include information for distinguishing different objects of 3D intraoral data. For example, the memory 310 may include color information, curvature information, etc. for distinguishing at least one object of 3D intraoral data.

The internal memory may include at least one of, for example, a volatile memory (e.g., dynamic RAM (DRAM), static RAM (SRAM), or synchronous dynamic RAM (SDRAM)), a non-volatile memory (e.g., one-time programmable ROM (OTPROM), programmable ROM (PROM), erasable and programmable ROM (EPROM), electrically erasable and programmable ROM (EEPROM), mask ROM, or flash ROM), a hard disk drive (HDD), and a solid-state drive (SSD). According to an embodiment, the processor 320 may load commands or data received from at least one of the non-volatile memory or other components into the volatile memory and process the commands or the data. Also, the processor 320 may retain data received from or generated by other components in the non-volatile memory.

The external memory may include at least one of, for example, compact flash (CF), secure digital (SD), micro secure digital (micro-SD), mini secure digital (mini-SD), extreme digital (xD), and a memory stick.

The processor 320 may control an overall operation of the intraoral image processing device 300 and may control an operation of the intraoral image processing device 300 by executing one or more instructions stored in the memory 310. The processor 320 may include at least one of a RAM, a ROM, a CPU, a GPU, and a bus. The RAM, the ROM, the CPU, and the GPU may be connected to each other through the bus.

The processor 320 according to an embodiment of the disclosure may execute one or more instructions stored in the memory 310 to obtain 3D intraoral data of an oral cavity including teeth and a gingiva and generate an outer surface of a target tooth that is a subject of a prosthesis from among the teeth included in the 3D intraoral data, wherein the generating of the outer surface may include automatically generating a portion corresponding to a void area between the target tooth and at least one adjacent tooth adjacent to the target tooth.

The processor 320 according to an embodiment of the disclosure may execute one or more instructions stored in the memory 310 to generate a portion corresponding to a void area based on 3D intraoral data.

The processor 320 according to an embodiment of the disclosure may execute one or more instructions stored in the memory 310 to generate a portion corresponding to a void area based on data adjacent to the void area in 3D intraoral data.

The processor 320 according to an embodiment of the disclosure may execute one or more instructions stored in the memory 310 to identify a virtual margin line between a target tooth and a gingiva and generate an outer surface based on the identified virtual margin.

The processor 320 according to an embodiment of the disclosure may execute one or more instructions stored in the memory 310 to generate a portion of an outer surface corresponding to a void area based on a portion of a virtual margin line corresponding to the void area.

The processor 320 according to an embodiment of the disclosure may execute one or more instructions stored in the memory 310 to identify a virtual bottom face corresponding to a bottom face of a target tooth based on a virtual margin line, identify a virtual target tooth by connecting the virtual bottom face to the target tooth, and generate an outer surface based on the virtual target tooth and the virtual margin line.

The processor 320 according to an embodiment of the disclosure may execute one or more instructions stored in the memory 310 to identify a virtual margin line based on data corresponding to a boundary of a gingiva and a target tooth in 3D intraoral data.

The processor 320 according to an embodiment of the disclosure may execute one or more instructions stored in the memory 310 to select, for each of points of a target tooth, at least one of the points of the target tooth by identifying a point whose distance to at least one of points included in a boundary of a gingiva is equal to or less than a preset threshold value based on data corresponding to the boundary of the gingiva and the target tooth in 3D intraoral data and identify a margin line by connecting the selected at least one point.

The processor 320 according to an embodiment of the disclosure may execute one or more instructions stored in the memory 310 to identify a virtual bottom face by expanding a reference surface identified based on a virtual margin line in a direction opposite to an occlusal direction of a target tooth and identify a virtual target tooth by merging the virtual bottom face with the target tooth.

The processor 320 according to an embodiment of the disclosure may execute one or more instructions stored in the memory 310 to generate an outer surface by aligning a virtual target tooth with a virtual margin line, dividing the virtual target tooth along the virtual margin line, and identifying an area of the dived virtual target tooth in an occlusal direction.

The processor 320 according to an embodiment of the disclosure may execute one or more instructions stored in the memory 310 to identify an expanded reference surface by expanding a reference surface identified based on a virtual margin line in a direction of an occlusion surface, identify a virtual adjacent gingiva for a gingiva adjacent to a target tooth by merging with the expanded reference surface with a surface obtained by expanding the expanded reference surface in a direction opposite to an occlusal direction, and generate an outer surface based on the virtual adjacent gingiva and a virtual target tooth.

The processor 320 according to an embodiment of the disclosure may execute one or more instructions stored in the memory 310 to generate an outer surface of a target tooth by booleaning a virtual adjacent gingiva and a virtual target tooth.

The processor 320 according to an embodiment of the disclosure may execute one or more instructions stored in the memory 310 to identify a virtual target tooth by merging a virtual bottom face with a target tooth and then smoothing a merged area.

According to an embodiment of the disclosure, the processor 320 may include an artificial intelligence (AI) processor for identifying objects including teeth and a gingiva in 3D intraoral data. Also, the processor 320 may include an AI processor for performing an operation of merging two different surfaces including a plurality of points. According to predefined operation rules or AI models, an AI processor may be controlled to process input data or may be designed as a hardware structure specialized in processing of specific AI models.

Predefined operation rules or an AI model may be created through learning, and when predefined operation rules or AI models are created through learning, it means that a basic AI model is trained using a plurality of training data by a learning algorithm to create predefined operation rules or AI models set to perform desired characteristics (or purpose). This learning may be performed in the device itself in which AI is performed according to the disclosure, or may be performed through a separate server and/or system.

However, not all of the illustrated elements are essential elements. The intraoral image processing device 300 may include more or fewer elements than the illustrated elements. For example, the intraoral image processing device 300 may include the memory 310, the processor 320, a display unit (not shown), a communication unit (not shown), and a user input unit (not shown).

The display unit may display a certain screen under the control of the processor 320. The display unit may include a display panel and a controller (not shown) for controlling the display panel, and the display unit may indicate a display built in the intraoral image processing device 300. The display panel may be implemented as any of various types of displays such as a liquid-crystal display (LCD), an organic light-emitting diode (OLED) display, an active-matrix organic light-emitting diode (AM-OLED), or a plasma display panel (PDP). The display panel may be flexible, transparent, or wearable. The display unit may be provided as a touchscreen by being combined with a touch panel of the user input unit (not shown). For example, the touchscreen may include an integrated module in which the display panel and the touch panel are stacked and combined.

The display unit according to an embodiment of the disclosure may display a user interface screen including 3D intraoral data. Also, the display unit may display an outer surface of a target tooth that is a subject of a prosthesis. Also, the display unit may display a virtual target tooth, a virtual adjacent gingiva, and a virtual margin line.

The communication unit (not shown) may communicate with at least one external electronic device through a wired or wireless communication network. In detail, the communication unit may communicate with the scanner 100 under the control of the processor 320. The communication unit may include one or more components that enable communication between the intraoral image processing device 300 and a plurality of devices or a server located around the intraoral image processing device 300 or a server. The communication unit may include one or more components that enable communication between the intraoral image processing device 300 and a server. Also, the communication unit may include a short-range communication unit.

Examples of the short-range communication unit (short-range wireless communication unit) may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, and an Ethernet communication unit.

Also, the communication unit may further include a long-range communication module communicating with a server to support long-range communication according to long-range communication standards. In detail, the communication unit may include a long-range communication module that performs communication through a network for Internet communication. Also, the communication unit may include a long-range communication module that performs communication through a communication network according to communication standards such as 3G, 4G, and/or 5G. Also, the communication unit may include at least one port for connection to an external electronic device through a wired cable in order to communicate with the external electronic device (e.g., intraoral scanner) by wire. Accordingly, the communication unit may communicate with an external electronic device connected by wire through at least one port.

The communication unit according to an embodiment of the disclosure may receive data obtained by the scanner 100, for example, raw data obtained by scanning an oral cavity, under the control of the processor 320.

The user input unit (not shown) may receive various instructions from a user, and the user input unit may refer to a means through which the user inputs data for controlling the intraoral image processing device 300. The user input unit may include at least one of, but not limited to, a key pad, a dome switch, a touch pad (e.g., contact capacitance type, pressure resistive type, infrared (IR) detection type, surface ultrasonic wave conduction type, integral tension measuring type, or piezoelectric effect type), a jog wheel, and a jog switch. The keys may include various types of keys such as mechanical buttons and wheels formed in various portions such as a front portion, a side portion, and a rear portion of the exterior of a main body of the intraoral image processing device 300. The touch panel may detect a user's touch input and may output a touch event value corresponding to a detected touch signal. When the touch panel and the display panel are combined with each other to constitute a touchscreen (not shown), the touchscreen may be implemented as any of various types of touch sensors such as a capacitive sensor, a resistive sensor, or a piezoelectric sensor.

In detail, the user input unit may include, but is not limited to, a touch panel for sensing a user's touch, a button for receiving the user's push operation, and a user input device including a mouse or keyboard for designating or selecting one point on a user interface screen. The intraoral image processing device 300 according to an embodiment of the disclosure may include a target tooth that is a subject of a prosthesis from among teeth in 3D intraoral data, based on a user's input through the user input unit.

Figure 4:
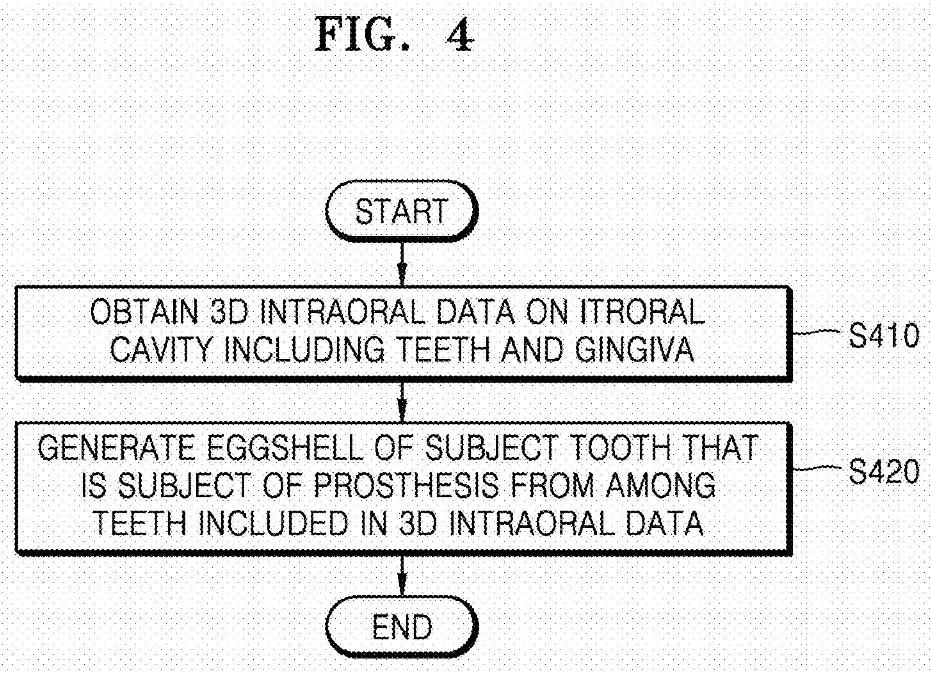
FIG. 4 is a flowchart illustrating an intraoral image processing method, according to an embodiment.

FIG. 4 is a flowchart illustrating an intraoral image processing method, according to an embodiment.

The intraoral image processing method of FIG. 4 may be performed by the intraoral image processing device 300.

Referring to FIG. 4, in operation S410, an intraoral image processing device according to an embodiment of the disclosure may obtain 3D intraoral data on an oral cavity including teeth and a gingiva.

For example, the intraoral image processing device 300 may receive raw data obtained by scanning the inside of the oral cavity including the teeth or scanning a tooth model by using the scanner 100, and may generate 3D intraoral data based on the received raw data. The intraoral image processing device 300 may obtain 3D intraoral data stored in a memory. Also, the intraoral image processing device 300 may obtain 3D intraoral data generated by the scanner. The intraoral image processing device 300 may obtain 3D intraoral data through a communication unit or the memory 310, but the disclosure is not limited thereto. For example, the intraoral image processing device 300 may obtain 3D intraoral data on the oral cavity including the teeth and the gingiva through a library model.

In operation S420, the intraoral image processing device according to an embodiment of the disclosure may generate an outer surface (eggshell) of a target tooth that is a subject of a prosthesis from among the teeth included in the 3D intraoral data.

The intraoral image processing device 300 according to an embodiment of the disclosure may generate an outer surface of a target tooth by automatically generating a portion corresponding to a void area between the target tooth and at least one adjacent tooth adjacent to the target tooth.

The intraoral image processing device 300 according to an embodiment of the disclosure may automatically generate an outer surface of a target tooth including a portion corresponding to a void area by using only the 3D intraoral data, without using external data such as a template. In detail, a portion of the generated outer surface corresponding to a void area may be generated based on data adjacent to the void area in the 3D intraoral data.

The intraoral image processing device 300 according to an embodiment of the disclosure may use a virtual margin line between the target tooth and a gingiva adjacent to the target tooth in order to generate the outer surface of the target tooth. In detail, the intraoral image processing device 300 may identify a margin line between the target tooth and the gingiva based on the 3D intraoral data, and may generate the outer surface along the identified margin line. The intraoral image processing device 300 may identify a virtual margin line, based on data corresponding to a boundary of the gingiva and the target tooth in the 3D intraoral data. The data corresponding to the boundary of the gingiva and the target tooth in the 3D intraoral data may include position information of a point of the boundary of the gingiva and position information of a point of the target tooth. The intraoral image processing device 300 may identify a virtual margin line similar to a margin line between an actual target tooth and an actual gingiva by using the position information of the point of the boundary of the gingiva and the position information of the point of the target tooth.

In order to accurately identify a virtual margin line, the intraoral image processing device 300 may select at least one point to be included in the virtual margin line and may identify the virtual margin line by connecting the selected at least one point. For example, the intraoral image processing device 300 may identify points located at a boundary between the target tooth and a gingiva adjacent to the target tooth as at least one point.

In detail, the intraoral image processing device 300 may identify, for each of points of the target tooth, points whose distance to at least one of points included in the boundary of the gingiva is equal to or less than a preset threshold value by using the data corresponding to the boundary of the gingiva and the target tooth in the 3D intraoral data. The identified points may be the selected at least one point. The threshold value may be stored in the memory 310, or may be a value adaptively adjusted by a user, a server, or the intraoral image processing device 300. Accordingly, the intraoral image processing device 300 may identify at least one point whose distance is equal to or less than the preset threshold value and thus that is located close to the boundary of the gingiva from among the points of the target tooth of the 3D intraoral data.

Also, the intraoral image processing device 300 according to an embodiment of the disclosure may identify a virtual margin line between the target tooth and the gingiva by connecting the selected at least one point.

The intraoral image processing device 300 according to an embodiment of the disclosure may identify a virtual margin line between the target tooth and the gingiva by connecting the selected at least one point from among the points of the target tooth located close to the boundary of the gingiva. In detail, the intraoral image processing device 300 may align the 3D intraoral data in an occlusal direction or a direction opposite to the occlusal direction. The intraoral image processing device 300 may identify a virtual margin line between the target tooth and the gingiva by connecting the at least one point clockwise or counterclockwise.

In the present application, a gingiva may be divided into a first gingiva corresponding to a front direction of the teeth and a second gingiva corresponding to a rear direction of the teeth. The intraoral image processing device 300 may generate a virtual margin line by connecting a tooth point located at a position equal to or less than a preset threshold value from the first gingiva based on a gingiva point closest to a tooth in the first gingiva to a tooth point located at a position equal to or less than a preset threshold value from the second gingiva based on a gingiva point closest to the tooth in the second gingiva. A specific embodiment of identifying a virtual margin line between the target tooth and the gingiva will be described in detail with reference to FIG. 6.

The intraoral image processing device 300 according to an embodiment of the disclosure may generate an outer surface of the target tooth based on the target tooth and the virtual margin line. In detail, the intraoral image processing device 300 may generate an outer surface of the target tooth similar to a shape of an actual tooth, by using at least one of a virtual target tooth and a virtual adjacent gingiva.

A specific embodiment of generating an outer surface of the target tooth by using the virtual target tooth and the virtual adjacent gingiva will be described in detail with reference to FIGS. 7 to 11.

The intraoral image processing device 300 according to an embodiment of the disclosure may display the generated outer surface of the target tooth on a display unit. For example, the intraoral image processing device 300 may overlay and display the generated outer surface of the target tooth on the 3D intraoral image data. Accordingly, the intraoral image processing device 300 may replace the target tooth requiring treatment with a provisional prosthesis and may provide the 3D intraoral data including the provisional prosthesis to the user through the display unit.

Figure 5:
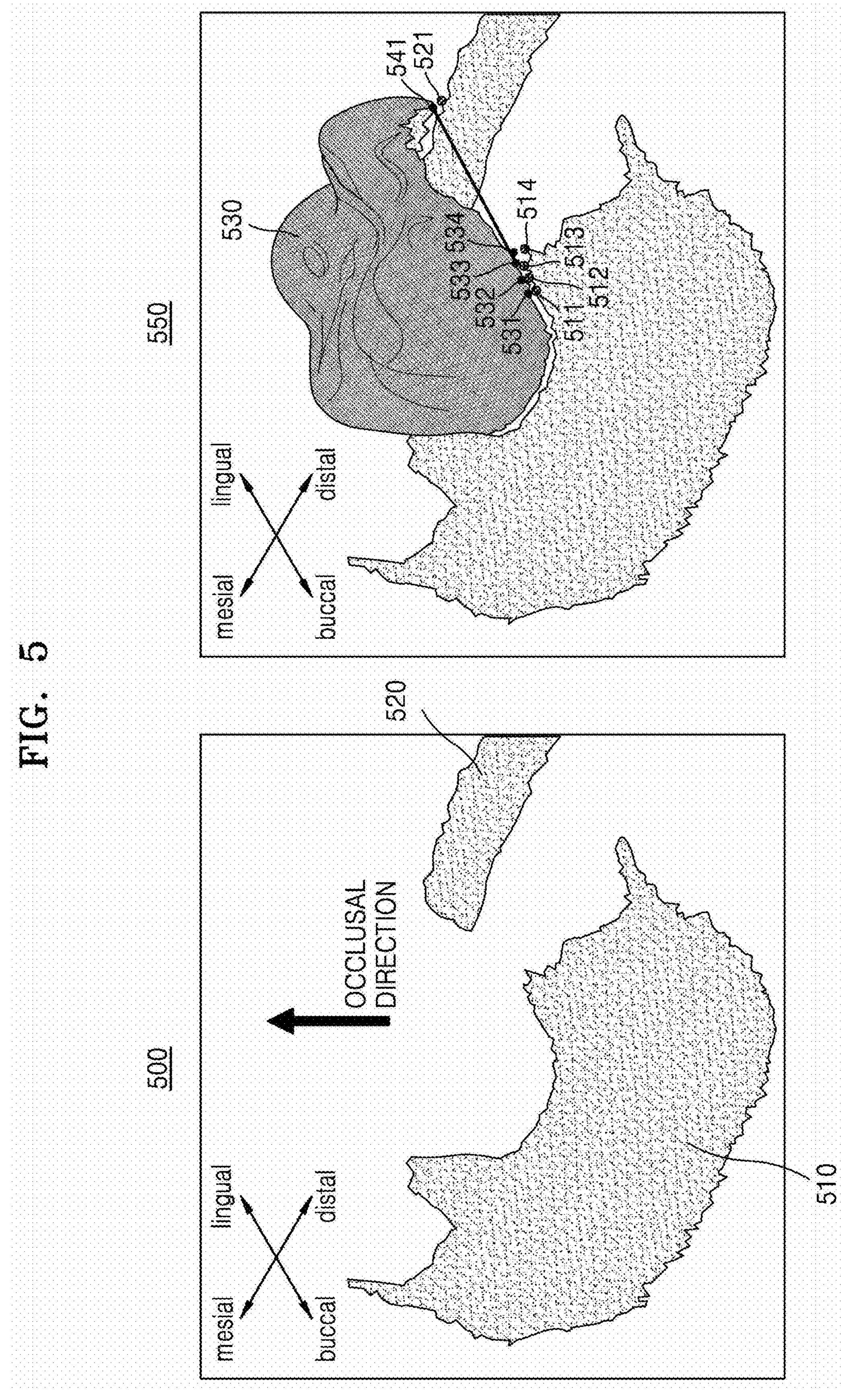
FIG. 5 is a view for describing an embodiment of identifying a virtual margin line, according to an embodiment of the disclosure.

FIG. 5 is a view for describing an embodiment of identifying a virtual margin line, according to an embodiment of the disclosure.

The intraoral image processing device 300 may identify a virtual margin line based on data of points located on a boundary of a gingiva and a target tooth in 3D intraoral data. In detail, the intraoral image processing device 300 may first determine positions to be located on a virtual margin line, based on the data corresponding to the boundary of the gingiva and the target tooth in the 3D intraoral data. FIG. 5 illustrates 3D intraoral data 500 and 3D intraoral data 550 for describing a method of selecting at least one point included in a virtual margin line in order to accurately identify the virtual margin line.

The intraoral image processing device 300 according to an embodiment of the disclosure may obtain, in order to select at least one point to be located on a margin line that is a boundary of a target tooth and a gingiva, the 3D intraoral data 500 in which the target tooth and at least one adjacent tooth adjacent to the target tooth are removed. In detail, because it is necessary to accurately identify at least one point on a virtual margin line, an operation of identifying teeth of 3D intraoral data and removing the identified teeth may be preceded. The intraoral image processing device 300 may identify teeth of 3D intraoral data through an AI model. In detail, the intraoral image processing device 300 may distinguish a target tooth and at least one adjacent tooth adjacent to the target tooth from a gingiva through an AI model that uses color information and curvature information of an object as training data.

Regarding the 3D intraoral data 500, the gingiva may include a first gingiva 510 corresponding to a front portion of the teeth and a second gingiva 520 corresponding to a rear portion of the teeth. In detail, the first gingiva 510 may refer to a gingiva located in a buccal direction in the gingiva, and the second gingiva 520 may refer to a gingiva located in a lingual direction in the gingiva. According to the 3D intraoral data 500, an occlusal direction of anz oral cavity may correspond to a direction shown in FIG. 5. The intraoral image processing device 300 may more accurately identify a virtual margin line by considering where points included in a virtual line are located between the first gingiva 510 and the second gingiva 520.

Regarding the 3D intraoral data 550, the intraoral image processing device 300 according to an embodiment of the disclosure may select, for each of points of the target tooth, at least one point by identifying a point whose distance to at least one of points included in the boundary of the gingiva is equal to or less than a preset threshold value based on position information of the points included in the boundary of the gingiva and position information of the points of the target tooth. The present threshold value may be less than 0.5 mm, but the disclosure is not limited thereto. The preset threshold value may be adaptively adjusted by a user, a server, or the intraoral image processing device 300.

For example, distances between a point 531, a point 532, and a point 533 which are points included in a target tooth 530 and a point 511, a point 512, and a point 513 which are points included in a boundary of the first gingiva of the gingiva may be equal to or less than a preset threshold value. Accordingly, at least one point that is selected may include the point 531, the point 532, and the point 533, and the point 531, the point 532, and the point 533 may be included in points located on a virtual margin line.

In contrast, a distance between a point 534 from among points of the target tooth and a point 514 that is closest to the point 534 from among points included in the boundary of the first gingiva of the gingiva may exceed the preset threshold value. Accordingly, the selected at least one point may not include the point 534. Accordingly, a last point in a distal direction from among the points of the target tooth may be the point 533.

Likewise, when identifying a point whose distance to at least one of points included in a boundary of the second gingiva 520 is equal to or less than a preset threshold value from among points of the target tooth 530 along a distal to mesial direction, the intraoral image processing device 300 may select a point 541 first. Accordingly, a last point in the distal direction from among the points of the target tooth may be the point 541.

The intraoral image processing device 300 according to an embodiment of the disclosure may identify a first virtual margin line by connecting points located on the target tooth corresponding to the first gingiva 510 from among the at least one point selected from the target tooth, may identify a second margin line by connecting points located on the target tooth corresponding to the second gingiva 520 from among the at least one point selected from the target tooth, and may identify a virtual margin line by connecting the first virtual margin line to the second virtual margin line.

The intraoral image processing device 300 may identify a first virtual margin line by connecting points located on the first target tooth corresponding to the first gingiva 510 from among the at least one gingiva 510 selected from the target tooth. For example, the intraoral image processing device 300 may generate a first virtual margin line by connecting points located on the target tooth corresponding to the first gingiva 510 from among the selected at least one point along a mesial to distal direction. Accordingly, the first virtual margin line may include the point 531, the point 532, and the point 533 in this order. The first virtual margin line may correspond to a virtual margin line included in an area where there is data. Likewise, a second virtual margin line may include the point 541, and may correspond to a virtual margin line included in an area where there is data, like the first virtual margin line.

Unlike this, the intraoral image processing device 300 may identify a virtual margin line corresponding to a void area based on data adjacent to the void area in the 3D intraoral data. The data adjacent to the void area may refer to data located around an area where there is no data. In detail, referring to FIG. 5, the data adjacent to the void area may include data on the point 513, the point 533, a point 521, and the point 541. The data on the point 513, the point 533, the point 521, and the point 541 may correspond to position data or position information about the point 513, the point 533, the point 521, and the point 541. The virtual margin line corresponding to the void area may be used to generate a portion of an outer surface of the target tooth corresponding to the void area.

The intraoral image processing device 300 may identify a virtual margin line by connecting the first virtual margin line to the second virtual margin line. In detail, the intraoral image processing device 300 may align the 3D intraoral data 550 in an occlusal direction and may connect the selected at least one point counterclockwise. In this case, a final virtual margin line may be completed by connecting the point 533 that is an end point of the first virtual margin line to the point 541 that is an end point of the second virtual margin line. In detail, a portion of the final virtual margin line corresponding to the void area may be identified by connecting the point 533 to the point 541.

Figure 6:
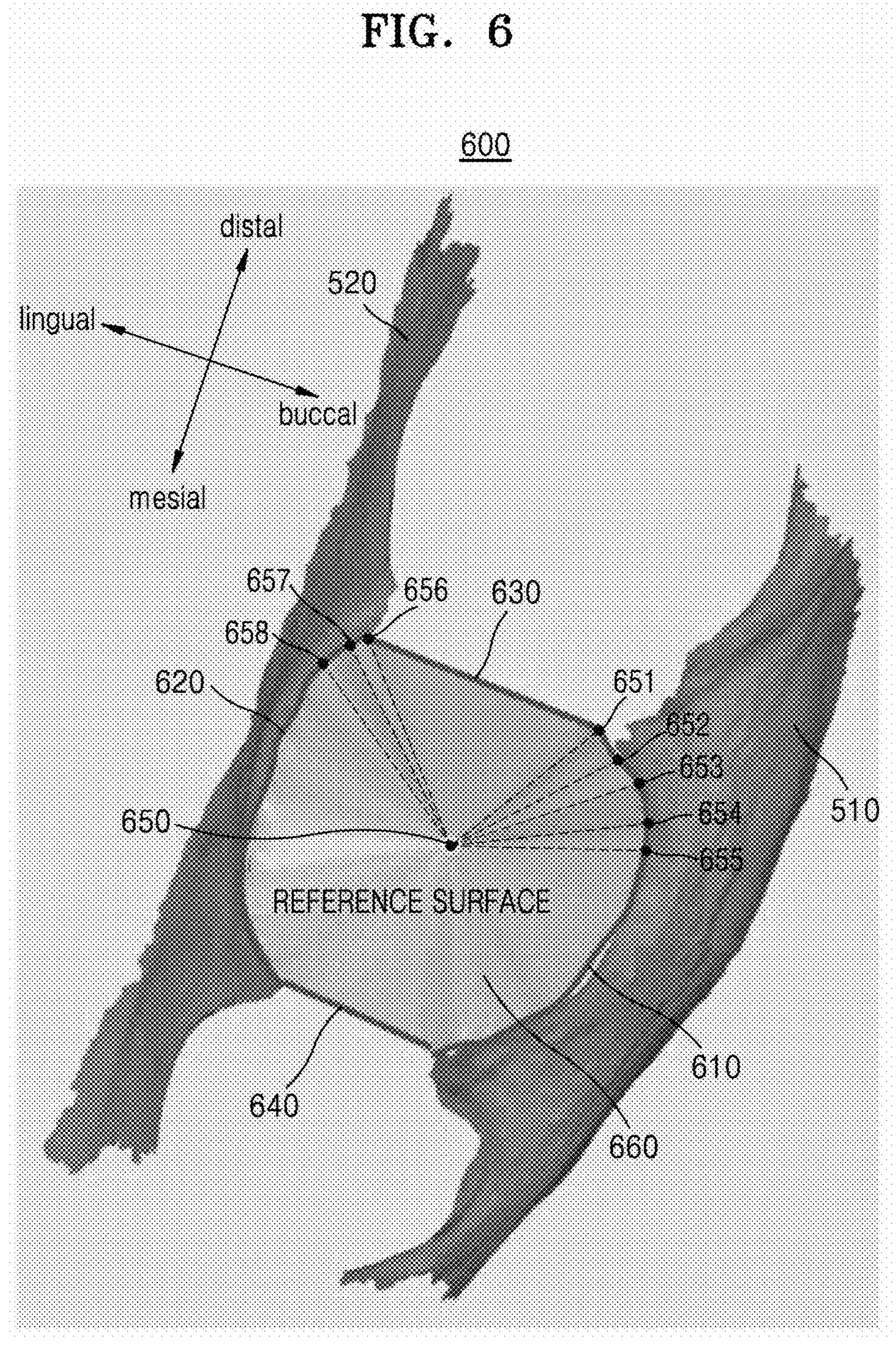
FIG. 6 is a view for describing an embodiment of identifying a virtual margin line identified according to the method of FIG. 5 and a reference surface identified according to the virtual margin line.

FIG. 6 is a view for describing an embodiment of identifying a virtual margin line identified according to the method of FIG. 5 and a reference surface including the virtual margin line.

FIG. 6 illustrates an embodiment of identifying a reference surface 660 identified along a virtual margin line along with the virtual margin line identified according to the method of FIG. 5.

The intraoral image processing device 300 according to an embodiment of the disclosure may identify a first virtual margin line 610 by connecting points located on a target tooth corresponding to the first gingiva 510 from among at least one point that is selected in 3D intraoral data 600, may identify a second virtual margin line 620 by connecting points located on the target tooth corresponding to the second gingiva 520 from among the selected at least one point, and may identify a virtual margin line by connecting the first virtual margin line to the second virtual margin line.

In detail, the intraoral image processing device 300 may identify a farthest point in a distal direction from among the points located on the target tooth corresponding to the first gingiva 510 from among the at least one point, and may identify a farthest point in the distal direction from among the points located on the target tooth corresponding to the second gingiva 520 from among the at least one point. Referring to FIG. 6, the farthest point in the distal direction from among the points located on the target tooth corresponding to the first gingiva 510 from among the at least one point may be a point 651, and the farthest point in the distal direction from among the points located on the target tooth corresponding to the second gingiva 520 from among the at least one point may be a point 656.

The intraoral image processing device 300 may identify a virtual margin line 630 in the distal direction by connecting the identified points. Likewise, the intraoral image processing device 300 may identify a virtual margin line 640 in a mesial direction. Referring to FIG. 6, a final virtual margin line may include the first virtual margin line 610, the second virtual margin line 620, the virtual margin line 630 in the distal direction, and the virtual margin line 640 in the mesial direction.

Here, the virtual margin line 630 in the distal direction and the virtual margin line 640 in the mesial direction may correspond to virtual margin lines identified based on data adjacent to a void area in the 3D intraoral data.

The intraoral image processing device 300 according to an embodiment of the disclosure may identify a reference surface based on a virtual margin line. In the present disclosure, a reference surface may refer to a surface based on which a target tooth and a virtual adjacent gingiva are generated in FIGS. 7 to 11.

The intraoral image processing device 300 may identify a reference surface based on at least one point located on a virtual margin line. In detail, referring to FIG. 6, the intraoral image processing device 300 may identify a center point 650 based on position information of at least one point included in a virtual margin line, and may identify a reference surface 660 in a 3D space using the virtual margin line as a boundary of the surface by connecting the center point 650 to the at least one point on the virtual margin line.

The intraoral image processing device 300 may identify an appropriate center point 650 by using position information of at least one point on a virtual margin line. For example, the intraoral image processing device 300 may identify the center point 650 from an average of the position information of the at least one point. Also, the intraoral image processing device 300 may identify the center point 650, by using only position information about some points on a virtual margin line. For example, the intraoral image processing device 300 may identify the center point 650 based on position information of points located on the virtual margin line 630 in the distal direction and the virtual margin line 640 in the mesial direction, but the disclosure is not limited thereto.

For example, referring to FIG. 6, the intraoral image processing device 300 may connect the center point 650 to the point 651, a point 652, a point 653, a point 654, a point 655, the point 656, a point 657, and a point 658 which are points on a final virtual margin line. Accordingly, the intraoral image processing device 300 may connect the center point 650 to at least one point of a virtual margin line and may identify a plurality of sub-surfaces including two adjacent point pairs from among the center point and the at least one point of the virtual margin line. For example, one of the identified plurality of sub-surfaces may be a triangular sub-surface including the center point 650, the point 651, and the point 652. The reference surface 660 may correspond to a surface in a 3D space including all of the plurality of sub-surfaces. Hereinafter, an embodiment of identifying a virtual target tooth and a virtual adjacent gingiva by using a reference surface and accurately generating an outer surface of a target tooth by using the virtual target tooth and the virtual adjacent gingiva will be described.

Figure 7:
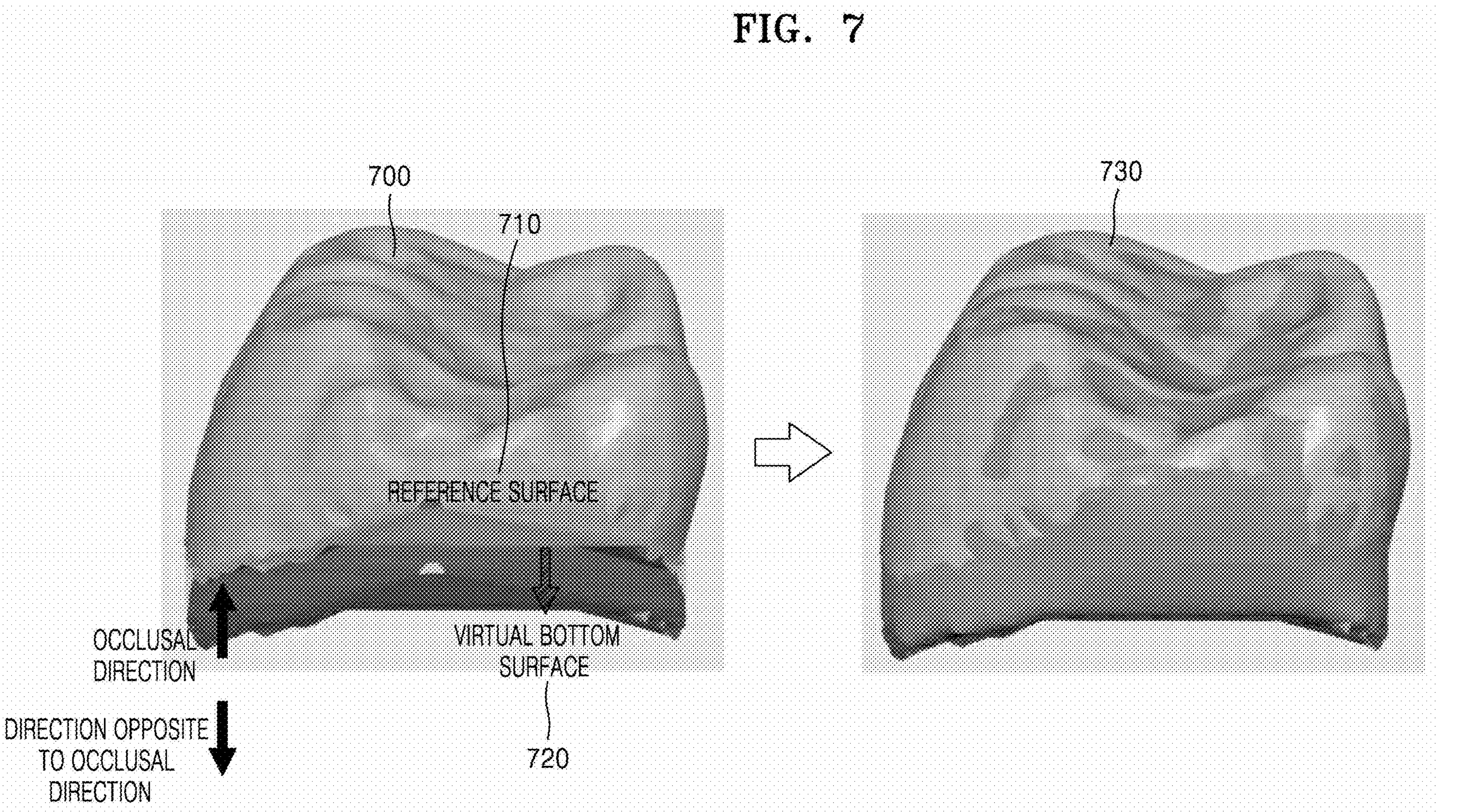
FIG. 7 is a view for describing an embodiment of identifying a virtual target tooth, according to an embodiment of the disclosure.

FIG. 7 is a view for describing an embodiment of identifying a virtual target tooth, according to an embodiment of the disclosure.

FIG. 7 illustrates an embodiment of identifying a virtual target tooth 730 based on a target tooth 700 and a reference surface 710.

In the present disclosure, a virtual target tooth may refer to an area obtained by expanding a target tooth in a direction opposite to an occlusal direction. An actual tooth may be divided into an area protruding above a gingiva and an area impacted under the gingiva. Accordingly, a virtual target tooth may refer to a tooth that also includes an area impacted under a gingiva by expanding a target tooth in a direction opposite to an occlusal direction.

The intraoral image processing device 300 according to an embodiment of the disclosure may identify a virtual bottom face 720 by expanding the reference surface 710 in the direction opposite to the occlusal direction of the target tooth 700. The intraoral image processing device 300 may identify the virtual bottom face 720 spaced apart from the reference surface 710 by a preset distance in the direction opposite to the occlusal direction. In detail, the intraoral image processing device 300 may generate the virtual bottom face 720 by offsetting the reference surface 710 by the preset distance in the direction opposite to the occlusal direction. To generate the virtual target tooth 730 to also include an area buried under the gingiva, the intraoral image processing device 300 may offset the reference surface 710 by the preset distance in the direction opposite to the occlusal direction.

The intraoral image processing device 300 according to an embodiment of the disclosure may identify the virtual target tooth 730 for the target tooth by merging the target tooth 700 with the virtual bottom face 720. For example, the intraoral image processing device 300 may appropriately generate points located in an area between the target tooth 700 and the virtual bottom face 720 by using a Poisson merging algorithm, and may generate the virtual target tooth 730 including the generated points. In the present application, a Poisson merging algorithm may refer to Poisson surface reconstruction technology.

Also, the intraoral image processing device 300 may identify the virtual target tooth 730 by merging the target tooth 700 with the virtual bottom face 720 and then smoothing a merged area. Through the smoothing, the intraoral image processing device 300 may adjust the vicinity of a virtual margin line of the virtual target tooth 730 to a natural curvature.

Figure 8:
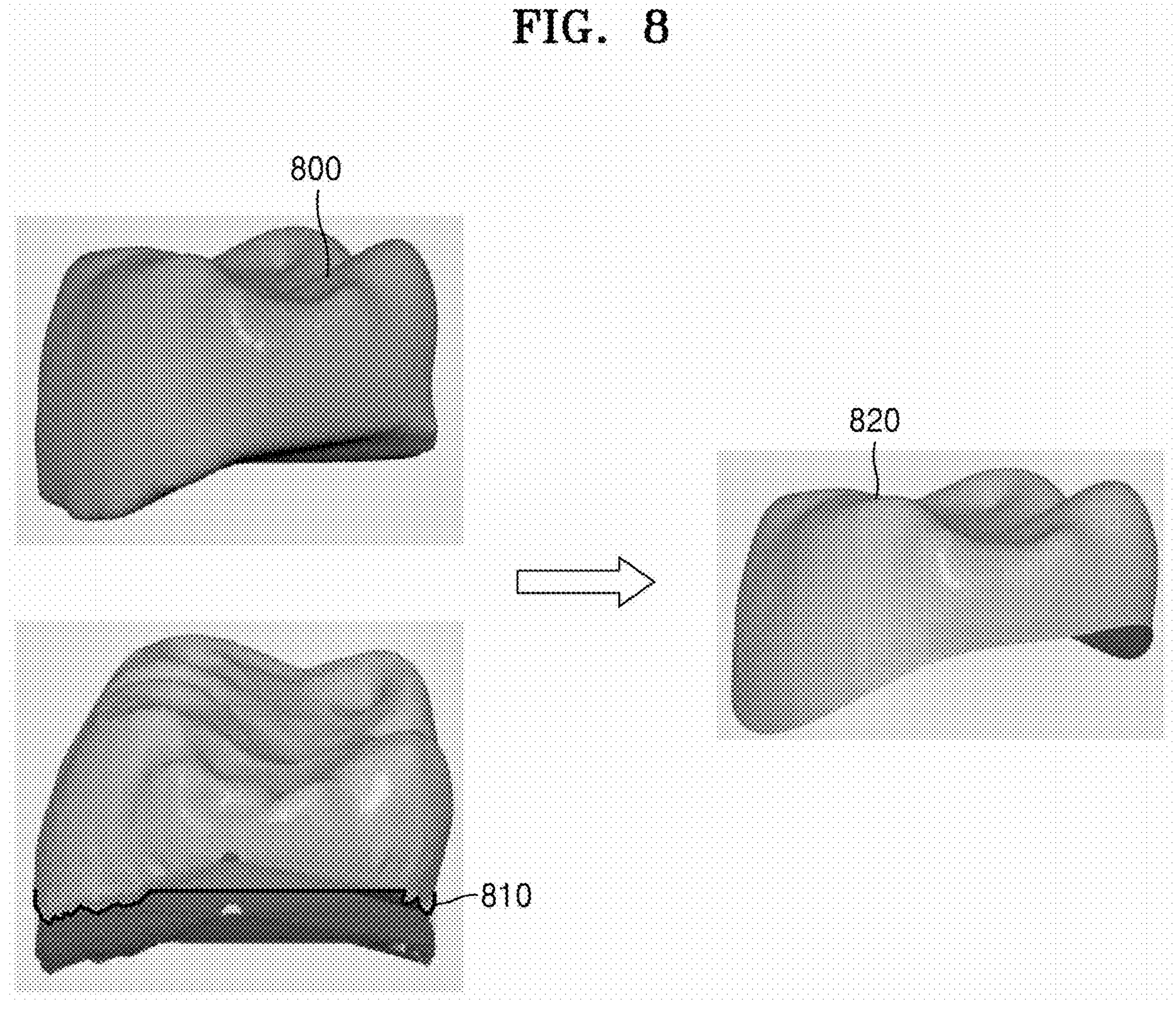
FIG. 8 is a view for describing an embodiment of generating an outer surface of a target tooth, according to an identified virtual target tooth and a virtual margin line.

FIG. 8 is a view for describing an embodiment of generating an outer surface of a target tooth, according to an identified virtual target tooth and a virtual margin line.

FIG. 8 illustrates an embodiment of generating an outer surface of a target tooth by dividing a virtual target tooth along a virtual margin line.

The intraoral image processing device 300 according to an embodiment of the disclosure may generate an outer surface 820 of a target tooth based on a virtual target tooth 800 identified according to the embodiment of FIG. 7 and a virtual margin line 810. In detail, the intraoral image processing device 300 may distinguish the virtual target tooth 800 into two areas based on position information of points of the virtual margin line 810 and the virtual target tooth 800. In detail, the intraoral image processing device 300 may divide the virtual target tooth 800 into different areas based on the virtual margin line 810.

The intraoral image processing device 300 may identify or generate an area in an occlusal direction from among the divided two areas (an upper area in FIG. 8) as the outer surface 820 of the target tooth.

The intraoral image processing device 300 according to an embodiment of the disclosure may generate only the outer surface 820 of the target tooth which is a final result, and may display the generated outer surface 820 of the target tooth on a display unit. On the other hand, the virtual target tooth 800 may only be identified by the intraoral image processing device 300 but may not be displayed on the display unit. However, the disclosure is not limited thereto. The intraoral image processing device 300 may generate the virtual target tooth 800 through a separate user interface screen and may display the virtual target tooth 800 on the display unit.

An embodiment of generating an outer surface of a target tooth is not limited thereto, and the outer surface of the target tooth may be automatically generated by using not only a virtual target tooth but also a virtual adjacent gingiva.

Figure 9:
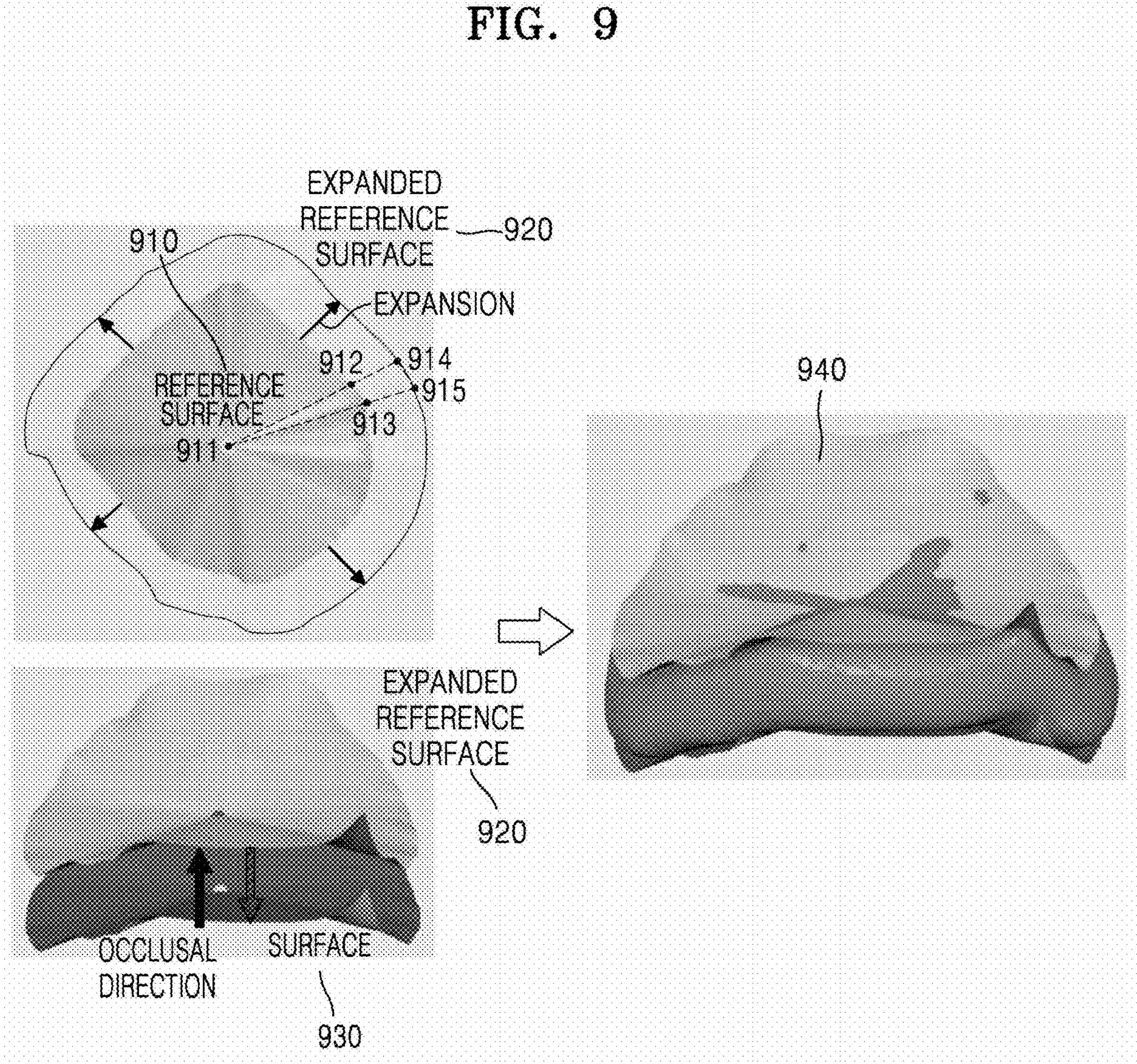
FIG. 9 is a view for describing an embodiment of identifying a virtual adjacent gingiva based on a reference surface.

FIG. 9 is a view for describing an embodiment of identifying a virtual adjacent gingiva based on a reference surface.

Referring to FIG. 9, the intraoral image processing device 300 may identify a virtual adjacent gingiva 940 for a gingiva adjacent to a target tooth, based on a reference surface 910.

In the specification, a virtual adjacent gingiva may be an area generated by expanding a reference surface and expanding the reference surface in a direction opposite to an occlusal direction. However, because the virtual adjacent gingiva may partially overlap an area impacted under a gingiva of an actual tooth, the virtual adjacent gingiva may have a different shape from a gingiva adjacent to an actual target tooth. Accordingly, a virtual adjacent gingiva may refer to a virtual area identified to accurately generate an outer surface of a target tooth.

The intraoral image processing device 300 according to an embodiment of the disclosure may identify an expanded reference surface 920 by expanding the reference surface 910 from the center of the reference surface 910 to each of points constituting a circumference of the reference surface 910. The intraoral image processing device 300 may identify the expanded reference surface 920 by expanding the reference surface 910 by a preset distance. Alternatively, the intraoral image processing device 300 may identify the expanded reference surface 920 by expanding the reference surface 910 by a preset ratio. In the present application, a direction in which the reference surface is expanded may refer to a direction in which each sub-surface included in the reference surface 910 is expanded, as shown in FIG. 9.

In detail, the reference surface 910 may include a plurality of sub-surfaces. For example, a first sub-surface may include a center point 911, a point 912, and a point 913. The intraoral image processing device 300 may select a point 914 by expanding a distance between the center point 911 and the point 912 to or by a preset distance. Likewise, the intraoral image processing device 300 may select a point 915 by expanding a distance between the center point 911 and the point 913 to or by a preset distance. One of sub-surfaces of the expanded reference surface 920 may include the point 911, the point 914, and the point 915. The intraoral image processing device 300 may generate the expanded reference surface 920 by applying a similar method to each sub-surface of the reference surface.

The intraoral image processing device 300 according to an embodiment of the disclosure may identify a surface 930 by expanding the expanded reference surface 920 in a direction opposite to the occlusal direction. In detail, the intraoral image processing device 300 may identify the surface 930 spaced apart by a preset distance from the reference surface 920 expanded in the direction opposite to the occlusal direction. In detail, the intraoral image processing device 300 may generate the surface 930 by offsetting the reference surface 920 expanded in the direction opposite to the occlusal direction by a preset distance.

The intraoral image processing device 300 according to an embodiment of the disclosure may identify the virtual adjacent gingiva 940 for the gingiva adjacent to the target tooth by merging the expanded reference surface 920 with the surface 930. The surface 930 may correspond to a bottom face of the virtual adjacent gingiva 940. However, the surface 930 may not correspond to a bottom face of an actual adjacent gingiva. The surface 930 may refer to a surface obtained by appropriately offsetting the expanded reference surface 920 to generate the virtual adjacent gingiva 940.

As described with reference to FIG. 7, when the expanded reference surface 920 and the surface 930 are merged with each other, merging-related technology may be used. The merging-related technology may include, for example, a Poisson algorithm. Also, the intraoral image processing device 300 may identify the virtual adjacent gingiva 940 by merging the expanded reference surface 920 with the surface 930 and then smoothing a merged area. Through the smoothing, the intraoral image processing device 300 may adjust the vicinity of a boundary of the virtual adjacent gingiva 940 to a natural curvature. Accordingly, the intraoral image processing device 300 may identify the natural virtual adjacent gingiva 940 for the gingiva around the target tooth.

Figure 10:
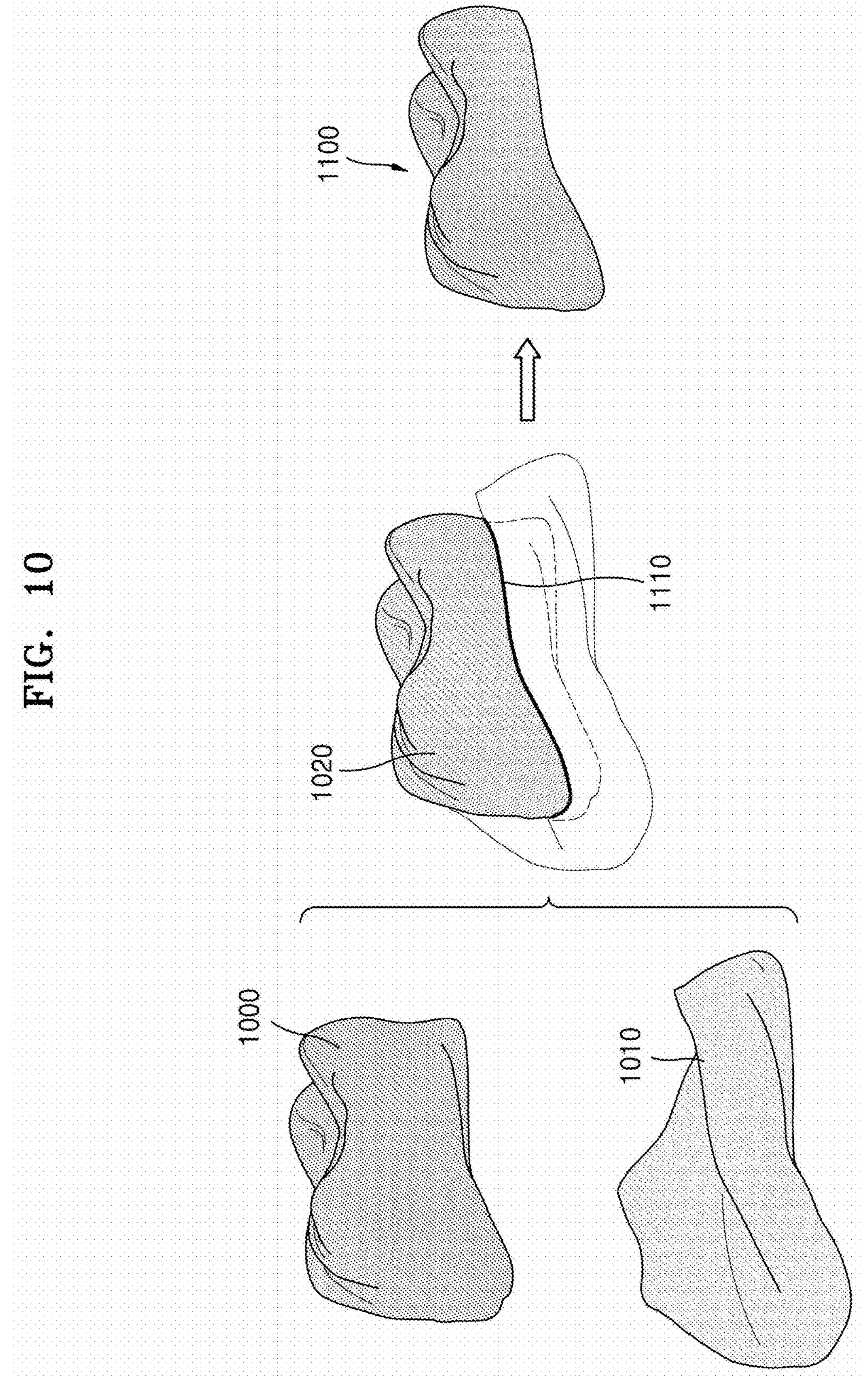
FIG. 10 is a view for describing an embodiment of generating an outer surface of a target tooth by using a virtual target tooth and a virtual adjacent gingiva.

FIG. 10 is a view for describing an embodiment of generating an outer surface of a target tooth by using a virtual target tooth and a virtual adjacent gingiva.

In order to more accurately generate an outer surface of a target tooth, the intraoral image processing device 300 may generate an outer surface of a target tooth by using both a virtual target tooth 1000 and a virtual adjacent gingiva 1010.

The intraoral image processing device 300 may generate an outer surface of a target tooth by booleaning the virtual adjacent gingiva 1010 and the virtual target tooth 1000. In detail, referring to FIGS. 10 and 11, the intraoral image processing device 300 may generate an outer surface 1100 of a target tooth by aligning the virtual target tooth 1000 with the virtual adjacent gingiva 1010 and identifying an area 1020 of the virtual target tooth 1000 not overlapping the virtual adjacent gingiva 1010.

The intraoral image processing device 300 according to an embodiment of the disclosure may align the virtual target tooth 1000 with the virtual adjacent gingiva 1010. In detail, the intraoral image processing device 300 may align the virtual target tooth 1000 with the virtual adjacent gingiva 1010 based on a virtual margin line. Alternatively, the intraoral image processing device 300 may align the virtual target tooth 1000 with the virtual adjacent gingiva 1010 based on a reference line. Because the virtual adjacent gingiva 1010 may include a portion of an actual tooth, the virtual target tooth 1000 and the virtual adjacent gingiva 1010 may partially overlap each other.

The intraoral image processing device 300 according to an embodiment of the disclosure may identify the area 1020 of the virtual target tooth 1000 not overlapping the virtual adjacent gingiva 1010. For example, referring to FIG. 10, the intraoral image processing device 300 may identify the area 1020 of the virtual target tooth 1000 not overlapping the virtual adjacent gingiva, 1010, by using position information of a point of the virtual target tooth 1000 and position information of the virtual adjacent gingiva 1010. The area 1020 that does not overlap may correspond to the outer surface 1100 of the target tooth.

In another embodiment, the intraoral image processing device 300 according to an embodiment of the disclosure may identify a curved line 1110 where the virtual target tooth 1000 and the virtual adjacent gingiva 1010 overlap each other, by using position information of a point of the virtual target tooth 1000 and position information of the virtual adjacent gingiva 1010.

In detail, the intraoral image processing device 300 may identify points where position information of the virtual target tooth 1000 and the virtual adjacent gingiva 1010 match each other, by using position information of a point of the virtual target tooth 1000 and position information of the virtual adjacent gingiva 1010. The curved line 1110 may include points where position information matches. Here, the curved line 1110 may be identified as a shape similar to a virtual margin line. Accordingly, the electronic device 300 may identify the outer surface 1100 of the target tooth located in an occlusal direction in the virtual target tooth 1000 divided along the curved line 1110.

The intraoral image processing device 300 according to an embodiment of the disclosure may generate only the outer surface 1100 of the target tooth which is a final result, and may display the generated outer surface 1100 on a display unit. On the other hand, the virtual target tooth 1000 and the virtual adjacent gingiva 1010 may only be identified by the intraoral image processing device 300 but may not be displayed on the display unit. However, the disclosure is not limited thereto. The intraoral image processing device 300 may generate the virtual target tooth 1000 and the virtual adjacent gingiva 1010 through a separate user interface screen and may display the virtual target tooth 1000 and the virtual adjacent gingiva 1010 on the display unit.

An intraoral image processing method according to an embodiment of the disclosure may be implemented as a program command executable by various computer means and may be recorded on a computer-readable medium. Also, an embodiment of the disclosure may provide a computer-readable storage medium having recorded thereon at least one program including at least one instruction for executing an intraoral image processing method.

A method according to an embodiment in the specification may be provided as a non-transitory storage medium. Here, 'non-transitory' means that the storage medium does not include a signal (e.g., an electromagnetic wave) and is tangible, but does not distinguish whether data is stored semi-permanently or temporarily in the storage medium. For example, the 'non-transitory storage medium' may include a buffer in which data is temporarily stored.

According to an embodiment, methods according to various embodiments of the disclosure may be provided in a computer program product. The computer program product is a product purchasable between a seller and a purchaser. The computer program product may be distributed in the form of a machine-readable storage medium (e.g., a compact disc read-only memory (CD-ROM)), or distributed (e.g., downloaded or uploaded) online via an application store or between two user devices (e.g., smartphones) directly. When distributed online, at least part of the computer program product (e.g., a downloadable application) may be temporarily generated or at least temporarily stored in a machine-readable storage medium, such as a memory of a server of a manufacturer, a server of an application store, or a relay server.

The above description of the disclosure is provided for illustration, and it will be understood by one of ordinary skill in the art that various changes in form and details may be readily made therein without departing from essential features or the scope of the disclosure as defined by the following claims. Accordingly, the above embodiments of the disclosure are examples only in all aspects and are not limited. For example, each component described as a single type may be implemented in a distributed manner, and similarly, components described as distributed may be implemented in a combined form.

The scope of the disclosure is defined by the appended claims rather than the detailed description, and all changes or modifications within the scope of the appended claims and their equivalents will be construed as being included in the scope of the disclosure.

The invention claimed is:

1. An intraoral image processing method comprising:
obtaining three-dimensional (3D) intraoral data on an oral cavity comprising teeth and a gingiva; and
generating an outer surface of a target tooth that is a subject of a prosthesis from among the teeth included in the 3D intraoral data,
wherein the generating of the outer surface comprises automatically generating a portion corresponding to a void area between the target tooth and at least one adjacent tooth adjacent to the target tooth,
wherein the void area comprises an unscanned area between the target tooth and the at least one adjacent tooth, where there is no scanned data, and
wherein the portion corresponding to the void area is generated based on a virtual margin line by connecting a first tooth point and a second tooth point, wherein the first tooth point is located at a position equal to or less than a preset threshold value from a first gingiva point on a boundary of a first gingiva, and the second tooth point is located at a position equal to or less than a preset threshold value from a second gingiva point on a boundary of a second gingiva.

2. The intraoral image processing method of claim 1, wherein the generating of the outer surface comprises generating the portion corresponding to the void area, based on the 3D intraoral data.

3. The intraoral image processing method of claim 2, wherein the generating of the outer surface comprises generating the portion corresponding to the void area, based on data adjacent to the void area in the 3D intraoral data.

4. The intraoral image processing method of claim 1, wherein the generating of the outer surface comprises:
identifying a virtual margin line between the target tooth and the gingiva, based on the 3D intraoral data; and
generating the outer surface, based on the target tooth and the identified virtual margin line.

5. The intraoral image processing method of claim 4, wherein the generating of the outer surface comprises generating a portion of the outer surface corresponding to the void area, based on a portion of the virtual margin line corresponding to the void area.

6. The intraoral image processing method of claim 4, wherein the generating of the outer surface comprises:
identifying a virtual target tooth by identifying a virtual bottom face corresponding to a bottom face of the target tooth based on the virtual margin line, and connecting the virtual bottom face to the target tooth; and
generating the outer surface, based on the virtual target tooth and the virtual margin line.

7. The intraoral image processing method of claim 6, wherein the identifying of the virtual target tooth comprises:
identifying the virtual bottom face, by expanding a reference surface identified based on the virtual margin line in a direction opposite to an occlusal direction of the target tooth; and
identifying the virtual target tooth, by merging the virtual bottom face with the target tooth.

8. The intraoral image processing method of claim 7, wherein the generating of the outer surface comprises:
aligning the virtual target tooth with the virtual margin line, and dividing the virtual target tooth into areas along the virtual margin line; and
generating the outer surface, by identifying an area in the occlusal direction from among the areas of the virtual target tooth.

9. The intraoral image processing method of claim 7, wherein the identifying of the virtual target tooth comprises identifying the virtual target tooth by merging the virtual bottom face with the target tooth and smoothing a merged area.

10. The intraoral image processing method of claim 6, further comprising:
identifying an expanded reference surface, by expanding a reference surface identified based on the virtual margin line;
identifying a virtual adjacent gingiva for a gingiva adjacent to the target tooth, by merging the expanded reference surface with a surface obtained by expanding the expanded reference surface in a direction opposite to an occlusal direction; and
generating the outer surface, based on the virtual adjacent gingiva and the virtual target tooth.

11. The intraoral image processing method of claim 10, wherein the generating of the outer surface comprises generating the outer surface of the target tooth, by booleaning the virtual adjacent gingiva and the virtual target tooth.

12. The intraoral image processing method of claim 4, wherein the identifying of the virtual margin line comprises:
for each of points of the target tooth, selecting at least one of the points of the target tooth, by identifying a point whose distance to at least one of points included in a boundary of the gingiva is equal to or less than a preset threshold value, based on data corresponding to the boundary of the gingiva and the target tooth in the 3D intraoral data; and
identifying the virtual margin line by connecting the selected at least one point.

13. An intraoral image processing device comprising:
a memory storing one or more instructions; and
a processor configured to execute the one or more instructions stored in the memory to
obtain three-dimensional (3D) intraoral data on an oral cavity comprising teeth and a gingiva, and
generate an outer surface of a target tooth that is a subject of a prosthesis from among the teeth included in the 3D intraoral data,
wherein a portion corresponding to a void area between the target tooth and at least one adjacent tooth adjacent to the target tooth is automatically generated, wherein the void area comprises an unscanned area between the target tooth and the at least one adjacent tooth, where there is no scanned data, and wherein the portion corresponding to the void area is generated based on a virtual margin line by connecting a first tooth point and a second tooth point, wherein the first tooth point is located at a position equal to or less than a preset threshold value from a first gingiva point on a boundary of a first gingiva, and the second tooth point is located at a position equal to or less than a preset threshold value from a second gingiva point on a boundary of a second gingiva.

14. The intraoral image processing device of claim 13, wherein the processor is further configured to execute the one or more instructions stored in the memory to generate a portion corresponding to the void area, based on the 3D intraoral data.

15. The intraoral image processing device of claim 13, wherein the processor is further configured to execute the one or more instructions stored in the memory to identify a virtual margin line between the target tooth and the gingiva, based on the 3D intraoral data, and generate the outer surface, based on the target tooth and the identified virtual margin line.

16. The intraoral image processing device of claim 15, wherein the processor is further configured to execute the one or more instructions stored in the memory to identify a virtual target tooth by identifying a virtual bottom face corresponding to a bottom face of the target tooth based on the virtual margin line, and connecting the virtual bottom face to the target tooth, and generate the outer surface, based on the virtual target tooth and the virtual margin line.

17. The intraoral image processing device of claim 16, wherein the processor is further configured to execute the one or more instructions stored in the memory to identify the virtual bottom face, by expanding a reference surface identified based on the virtual margin line in a direction opposite to an occlusal direction of the target tooth, and identify the virtual target tooth, by merging the virtual bottom face with the target tooth.

18. The intraoral image processing device of claim 16, wherein the processor is further configured to execute the one or more instructions stored in the memory to identify an expanded reference surface, by expanding a reference surface identified based on the virtual margin line, identify a virtual adjacent gingiva for a gingiva adjacent to the target tooth, by merging the expanded reference surface with a surface obtained by expanding the expanded reference surface in a direction opposite to an occlusal direction, and generate the outer surface, based on the virtual adjacent gingiva and the virtual target tooth.

19. A non-transitory computer-readable recording medium having recorded thereon a program which, when executed, causes a computer to perform an intraoral image processing method, the intraoral image processing method comprising:

obtaining three-dimensional (3D) intraoral data on an oral cavity comprising teeth and a gingiva; and generating an outer surface of a target tooth that is a subject of a prosthesis from among the teeth included in the 3D intraoral data, wherein the generating of the outer surface comprises automatically generating a portion corresponding to a void area between the target tooth and at least one adjacent tooth adjacent to the target tooth, wherein the void area comprises an unscanned area between the target tooth and the at least one adjacent tooth, where there is no scanned data, and wherein the portion corresponding to the void area is generated based on a virtual margin line by connecting a first tooth point and a second tooth point, wherein the first tooth point is located at a position equal to or less than a preset threshold value from a first gingiva point on a boundary of a first gingiva, and the second tooth point is located at a position equal to or less than a preset threshold value from a second gingiva point on a boundary of a second gingiva.

* * * * *